INVENTOR
JULIUS REINER

BY Joseph Weingarten
ATTORNEY

May 3, 1960 J. REINER 2,935,255

HIGH SPEED DECADE COUNTER

Filed Nov. 15, 1954 2 Sheets-Sheet 2

INVENTOR
JULIUS REINER

Joseph Weingarten
ATTORNEY 2,935,255

HIGH SPEED DECADE COUNTER

Julius Reiner, Cambridge, Mass., assignor to Laboratory For Electronics, Inc., Boston, Mass., a corporation of Delaware Application November 15, 1954, Serial No. 468,593

20 Claims. (Cl. 235—92)

The present invention relates in general to electronic counter circuits and more particularly concerns an exceedingly high speed electronic counter capable of visually indicating the accumulated count in decimal notation.

Broadly speaking, an electronic counter is a circuit capable of accepting a train of periodic or aperiodic pulses and yielding an output indicative of the number so accepted. As is well-known, a large number of circuits exist capable of performing this function, one common type having as its basis a conventional bistable binary counter circuit capable of assuming either one of two stable states under the influence of the input signal. In essence the circuit is capable of dividing by two; that is, it produces one output pulse for every two input pulses.

A binary counter capable of accumulating substantially any desired count may be readily constructed by cascading an appropriate number of binary counter stages. Evidently if $n$ stages are utilized, the total count which may be stored is $2^n$. By the appropriate placement of indicating apparatus such as neon bulbs, those binary stages which are other than in the first state may readily be ascertained. By assigning the binary digit "zero" to those stages in the first state and the binary digit "one" to the stages in the opposite or second state, the total count may readily be determined as a binary number.

While the multistage binary counter has achieved considerable status in the art and is extremely useful in the computer field wherein it is desired to introduce the data automatically in binary form, numerous applications exist where it is desired to count decimally and present this count visually in decimal form. However, in most cases, decade indication does not change the fundamental nature of the count, that is to say, with certain notable exceptions, most decade counters are modified cascaded binary stages. In one of the most common commercially available designs, a count of ten is achieved by cascading four binary counter stages with appropriate use of feedback. In counting to ten, the four stages of the decade counter uniquely assume ten distinctive conditions of stability. By utilizing a complex resistive matrix, a separate neon bulb may be illuminated for each of the ten above conditions, and a visual indication in the decimal system of the count stored may be presented. The illumination of the bulbs in this system generally depends on the conducting state of at least three tubes; hence, reliability of the firing of these bulbs is noticeably sensitive to tube parameter variation.

At counting rates near and below 100 kc., the customary four-stage circuit provides excellent service while using low-power tubes and relatively few components. No problems are encountered in the operation of the feedback loop. However, as the input pulse rate increases, the effect of stray and interelectrode capacitances becomes noticeable, resulting in difficulty in obtaining the necessary rapid switching. This problem may be overcome by resorting to high-current tubes and low time constant charge and discharge circuits if one is willing to accept high power consumption and expensive tubes; and, in fact, binary counters which perform at high input signal frequencies utilizing high current triodes or pentodes are available. However, in efforts to alter these binary counters for decade operation, great difficulty has been encountered in attaining the necessary high-speed operation of the feedback loop. Consequently, economy of power and active and inactive circuit components precluded commercial availability of decade scalers operative at 10 mc. and higher with direct neon bulb decimal indication.

The present invention contemplates and has as its primary object the provision of a high speed decade counter capable of operation at frequencies well above those heretofore practical with receiving-type triode tubes. In its most basic form, this invention combines the principles of ring and binary counters, and for decade operation comprises a five-stage ring counter driven by a binary counter with indicator bulbs energized from predetermined junctions in both. As will become apparent from the discussion below, for decimal notation, a pair of neon bulbs are connected from each stage of the ring counter to the binary counter in a manner such that only one bulb at a time is illuminated, these being sequentially switched on in accordance with pulses entering the binary counter.

It is therefore another object of the present invention to provide a high speed decade counter utilizing a simplified, highly reliable neon bulb indicating system for decimally presenting an accumulated count.

Still another object of this invention is to provide the above advantages at low power consumption with a reduced number of tube envelopes.

These and other objects and advantages will become apparent after reading the following specifications with reference to the accompanying drawing in which.

Figure 1:
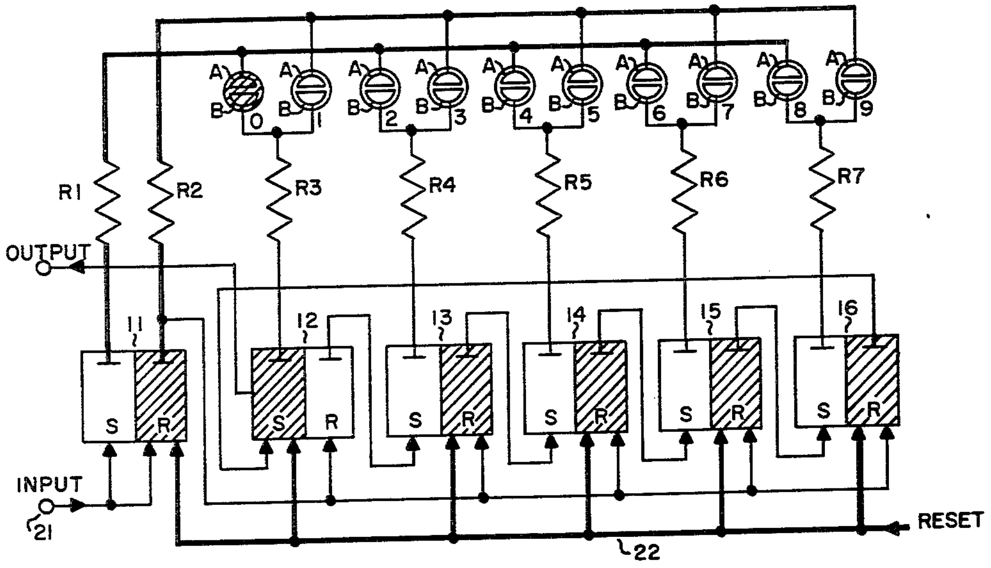
Fig. 1 is a block diagram of a preferred embodiment of the system.

Referring now to Fig. 1, a brief description of the symbols helpful in understanding the operation will be first presented. The square blocks represent bistable multivibrators which in their most common form include a pair of triodes whose plate voltage swings are used to provide the necessary outputs. Shaded areas indicate that the particular section is shown conducting. The letter S denotes a "set" pulse input while the letter R denotes a "reset" pulse input. To reduce the number of reference characters, the sections of each multivibrator will be designated by the letters S and R, as already noted, for their inputs. The resistors shown merely limit the current through the neon bulbs, the latter being numbered consecutively with the digits 0–9, each digit representing the count presented visually when the particular bulb is illuminated. A D.-C. power supply (not shown) provides input multivibrator 11 with plate potential higher than that supplied to the other multivibrators. This difference in supply potentials is adjusted so that it is just below the firing potential of the neon bulbs, reducing the plate voltage swing necessary to fire the bulbs. Consequently, a neon bulb connected between the two supply potentials will not be illuminated.

For reasons which will become apparent shortly, the A electrodes of neon bulbs 0, 2, 4, 6 and 8 are connected through R1 to the plate of section S of multivibrator 11 while the A electrodes of bulbs 1, 3, 5, 7 and 9 are connected through resistor R2 to the plate of section R of multivibrator 11. The B electrodes of neon bulbs 0 and 1 are tied together and this junction connected to the plate of section S of multivibrator 12 through R3. In a similar manner successive pairs have their B electrodes joined and connected through resistors R4, R5, R6 and R7 to the plates of the S sections of multivibrators 13, 14, 15 and 16 respectively. Thus each neon bulb has its A electrode connected to a plate of multivibrator 11 and its B electrode to the plate of an S section of one of the other multivibrators. As a result, four different potentials will appear across each bulb at various times, but only one of these four will be of sufficient magnitude to fire the bulb.

For example, consider bulb 0. When sections S of multivibrators 11 and 12 are off, the potential across bulb 0 is substantially the difference between the D.-C. voltage supplied multivibrator 11 and the D.-C. voltage supplied to the other multivibrators. As was mentioned earlier, this is insufficient to fire the bulb. When sections S of these two multivibrators are conducting, the potential across bulb 0 is too small to commence firing. Obviously if section S of multivibrator 11 is conducting and section S of multivibrator 12 is not, bulb 0 cannot fire. This leaves as the condition for firing that section S of multivibrator 11 must not be conducting while section S of multivibrator 12 must conduct. Then electrode A of bulb 0 is substantially returned to the higher D.-C. supply potential while its B electrode is tied to the relatively low potential on the plate of conducting section S of multivibrator 12. This potential difference across bulb 0 causes it to fire. The advantage of using a different D.-C. potential to supply multivibrator 11 than is used for the other multivibrators is now apparent. By effectively biasing the bulbs to a value just below their firing potential, only a small drop in the plate potential of an S section of multivibrators 12, 13, 14, 15 and 16 will result in a bulb firing. Hence the firing of a bulb is independent of tube aging characteristics in the forementioned multivibrators; and because ignition occurs when the A electrode of a bulb is connected to an off section of multivibrator 11, the firing is independent of tube aging conditions here also.

Figure 2:
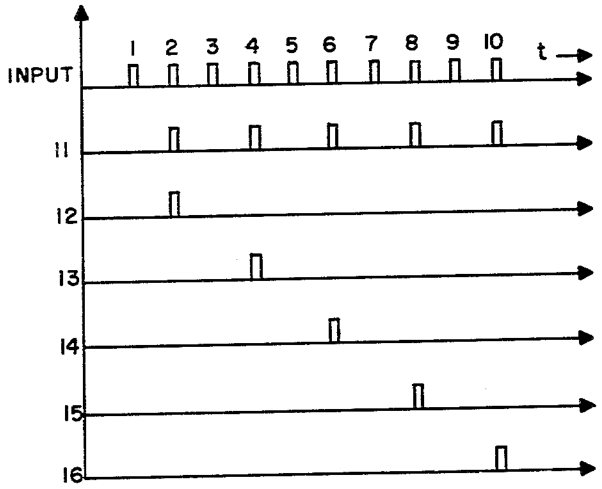
Fig. 2 is a graphical display of output pulses from counter stages in Fig. 1, drawn to the same time scale as the input pulses.

Fig. 2 shows a series of ten input pulses which may be applied to the counter shown in Fig. 1, and immediately below these pulses there appear pulses which are fed from the plates of the R section of the multivibrators indicated to following multivibrators at the time indicated, in a manner which will now be described. The input pulses of Fig. 2 enter at terminal 21 (Fig. 1) of multivibrator 11. Note that the set input and reset input of this multivibrator are connected in parallel; hence, the multivibrator sections will change states on each pulse. As shown in the zero, or first condition, in Fig. 1 no pulses have been received, the S section of multivibrator 11 is off, the S section of multivibrator 12 is on, all other S sections are off and consequently the 0 bulb is ignited as shown. Consider now the effect of pulse 1 of Fig. 2 entering at input terminal 21. The S section of multivibrator 11 is turned on while its R section is turned off. No changes occur in the other multivibrators. As a result bulb 0 is extinguished and bulb 1 ignited. Now pulse 2 enters input 21 causing the S section of multivibrator 11 to be cut off and the R section to be turned on. At this time, as is indicated in Fig. 2, a pulse appears on the plate of the R section of multivibrator 11 which is coupled to all the reset inputs of the other multivibrators and causes any R sections of multivibrators 12 through 16 which are then non-conducting, to conduct. Thus section R of multivibrator 12 is switched on and sections S, off. As a result of this change a pulse appears on the plate of the R section and is coupled to the set input of multivibrator 13 causing section S to conduct and section R to cut off. The events just described cause bulb 1 to be extinguished and bulb 2 to ignite.

In a similar manner, a pulse appears on the plate of section R of multivibrator 13 after the fourth input pulse, on the plate of section R of multivibrator 14 after the sixth input pulse, on the plate of section R of multivibrator 15 after the eighth input pulse and on the plate of section R of multivibrator 16 after the tenth input pulse. The pulse on the plate of section R of multivibrator 16 is fed to the set input of multivibrator 12, igniting bulb 0 and preparing the counter to count another decade of pulses.

Note that the reset pulses from the plate of the R section of multivibrator 11 effectively shifts the conducting S section from multivibrator to multivibrator in the ring formed by multivibrators 12 through 16, one stage for every two input pulses, thus accomplishing the successive ignition of bulbs 0 through 9 as each input pulse enters.

A voltage of the proper magnitude and polarity when applied to reset bus 22, normally biased at ground potential, causes all sections to which it is coupled to conduct and has the effect of restoring the counter to the zero condition shown.

Figure 3:
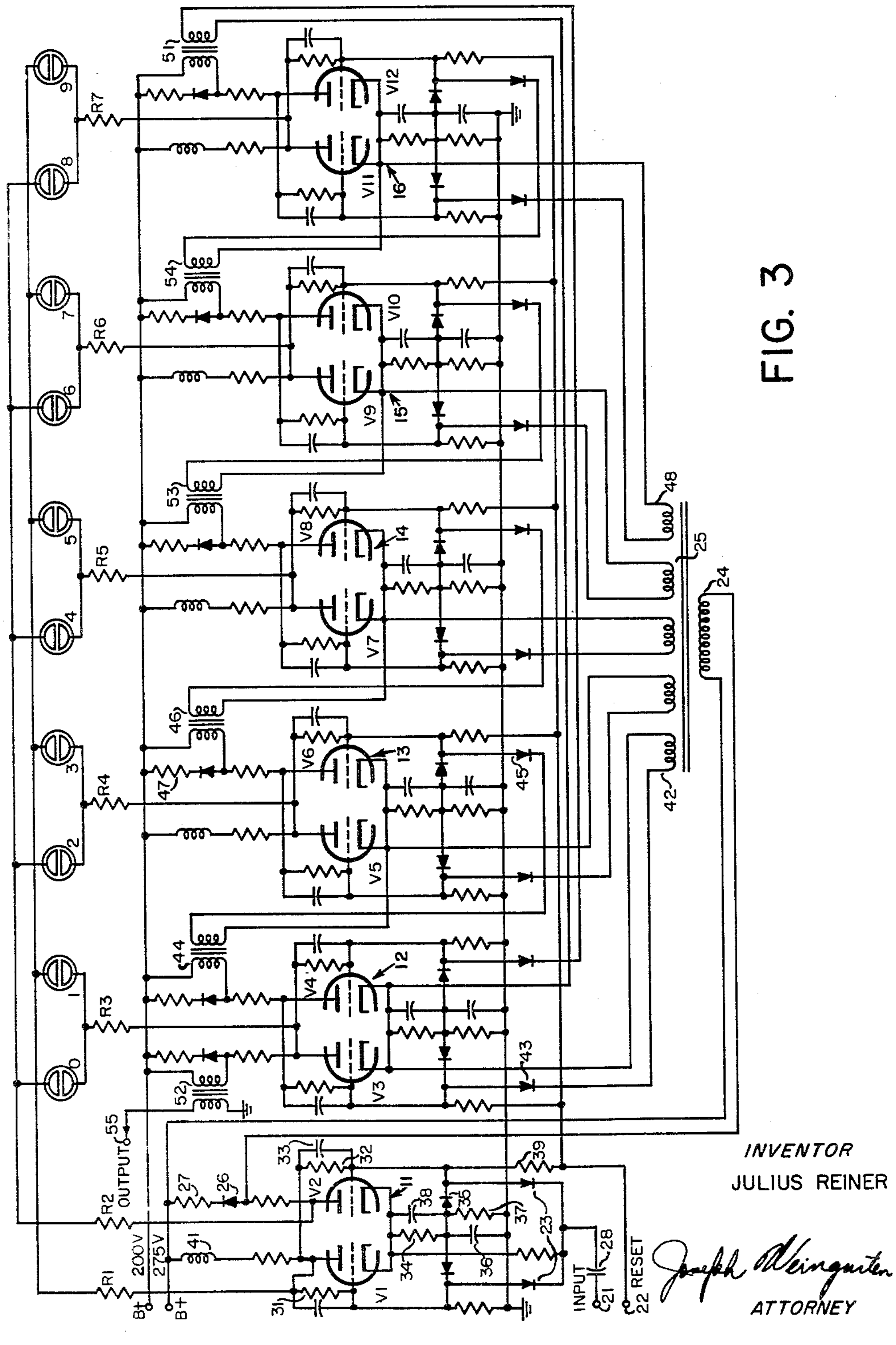
Fig. 3 is the schematic circuit diagram of the system shown in Fig. 1.

Fig. 3 is a schematic circuit diagram of the counter illustrated generally in Fig. 1, and the latter should greatly facilitate the understanding of the detailed drawing. Wherever applicable, reference symbols appearing in Fig. 1 appear in Fig. 3.

With particular reference to Fig. 3, tubes V1 and V2 and their associated circuitry constitute multivibrator 11 which is the input binary counter. Tubes V3 through V12 with associated components form multivibrators 12 through 16 which comprise the ring counter. Transformer 25 with its single primary and five secondaries serves to couple the output of the binary counter to each of the multivibrators in the ring. As mentioned before, each of the digit indicating neon bulbs 0 through 9 has one terminal coupled to the binary counter, and one, to the ring counter. When the ring has completed one cycle, that is, the counter has received ten pulses, an output pulse appears at terminal 55. Since the multivibrator circuits used for the several stages are substantially the same, a detailed description of only one of the circuits shown will be given.

In Fig. 3, pulses to be counted enter at input terminal 21 through coupling capacitor 28 and are applied to the grids of V1 and V2 through the crystal diodes 23 polarized to admit only negative pulses. Assume that V2 and V3 are conducting; then, bulb 0 is illuminated. The first negative pulse at input terminal 21 will have no effect on non-conducting tube V1 but will cut off V2. The plate current of V2 flows through the primary 24 of transformer 25. Because of its inductive nature, a voltage will be generated across the primary proportional to the time-derivative of V2 plate current and of a polarity tending to oppose this current change. But this polarity is such that crystal diode 26 conducts, and the voltage pulse so generated is reduced to a very small amplitude by the low forward impedance of crystal diode 26 in series with resistor 27, the diode serving primarily to prevent ringing. On this change from conduction to non-conduction in V2, therefore, there is negligible output across any of the secondary windings and none of the other multivibrators are switched. This rise in potential on the plate of V2 is transmitted through resistor 31 to the grid of V1, causing it to conduct. The drop in plate potential of V1 is coupled to the grid of V2 by the over-compensated voltage-divider network formed by resistors 32 and 39, capacitor 33 and the input capacity to V2. It is desirable to discharge capacitor 33 speedily so that V2 will reach its quiescent state as rapidly as possible in preparation for being switched back on. The discharge occurs mainly through the relatively low series resistance formed by the plate resistance of V1, resistor 34 and crystal diode 35. Capacitor 36 is of a relatively large value so as to maintain the potential across resistor 37 substantially constant. The quiescent potential across resistor 37 is greater than that across resistor 34.

The multivibrators are designed so that grid current is never drawn. By operating the tubes in this manner, reliable performance is ascertained, even though the tube characteristics may change with age because these changes are most noticeable when the tube is operated at zero bias. It is quite rare for two tubes of the same type randomly selected to have identical characteristics; hence, although the components for the multivibrator formed by V1 and V2 are selected so that the circuit is substantially symmetrical, still the plate voltage on V1 quiescently conducting will be different from the plate potential on V2 in the quiescent state. Consequently, when V1 is suddenly switched off, the rise in plate potential transmitted to the grid of V2 through resistor 32 will be different from the rise in potential on the plate of suddenly switched off V2 transmitted through resistor 31 to the grid of V1. If the cathode were maintained at a constant potential during one of the switchovers, it would be possible for one of the grids to attain a potential higher than that of the cathode, causing grid current to flow. To avoid this, capacitor 38 is chosen small enough so that it is an incomplete bypass for resistor 34. Hence, the cathode can follow the rise in grid potential well enough to prevent the cathode from assuming a potential lower than that on a grid.

V2 having been switched off and V1 switched on, bulb 0 is extinguished and bulb 1 illuminated. The next negative input pulse will switch V1 off. The rise in plate potential on V1 will be transmitted through resistor 32 switching on V2. The increase in current through the primary 24 of transformer 25 produces a potential proportional to the time derivative of this current of a polarity tending to oppose the change in current and causing crystal diode 26 to be non-conducting. If crystal diode 26 had no shunt capacity, resistor 27 would be superfluous; however, it is not an ideal diode, and the amplitude of the pulse produced across winding 24 would be reduced substantially by this shunt capacity. Resistor 27 is chosen small enough so that the damping action of crystal diode 26 is effective in preventing ringing and large enough to make the shunt capacity of crystal diode 26 substantially ineffective in bypassing negative pulses. Inductance 41 is a peaking coil.

Note that networks identical to that formed by resistor 27 and crystal diode 26 are across the primaries of transformers 52, 44, 46, 53, 54 and 51 for the same purpose; that is, they prevent ringing and permit only negative pulses to appear across the transformer primary so that a pulse appears across the secondary of the transformer only when the tube, in whose plate circuit the primary is, commences conduction.

The secondaries on transformer 25 are wound so that a negative pulse across the primary produces a negative pulse across the secondary. Hence, when V2 is switched on, the secondary 42 couples a negative pulse to the grid of V3 through crystal diode 43, switching V3 off and V4 on. The increasing plate current of V4 passing through the primary of transformer 44 produces a negative pulse across its primary and a negative pulse across the secondary which is coupled to the grid of V6 through crystal diode 45, cutting off V6 and turning on V5. No pulse of any substantial amplitude is produced across transformer 46 on this switch because of resistor-crystal diode network 47, identical in function to the network formed by resistor 27 and crystal diode 26 previously described. With V5 and V2 now conducting bulb 3 is illuminated.

In a similar manner the remaining bulbs are sequentially ignited in synchronism with the arrival of negative pulses at input terminal 21.

After nine negative pulses at input terminal 21, V2 is off, V11 is on and bulb 9 is illuminated. The tenth pulse switches V1 off and V2 on. A pulse is generated at winding 48 of transformer 25 cutting off V11, and V12 is switched on producing a pulse across the primary of transformer 51. The negative pulse across the secondary of transformer 51, the link which completes the chain between multivibrators 16 and 11 of the ring, switches V4 off, and V3 is switched on producing a pulse across the primary of transformer 52. An output pulse is taken at terminal 55 from the secondary of transformer 52 for every ten negative input pulses at terminal 21.

In the particular circuit shown a positive pulse may at any time be applied to reset terminal 22, and hence to the grids of V2, V3, V6, V8, V10 and V12 turning all these tubes on and restoring the counter to its zero condition; that is, bulb 0 is illuminated while all other bulbs are off. In normal operation a succession of input pulses will actuate the various counter stages, providing one final output pulse for each ten received. In such apparatus as an instrument for indicating the number of input pulses (events) per selected time unit, additional decade counting stages would be cascaded with the counter stage shown. At the termination of the selected time unit, the illuminated neon bulb will indicate the residual count in that decade. After reading, a positive pulse manually or automatically applied to terminal 22 will reset this decade to zero count.

While triodes have been shown in the preferred embodiment because commercially available twin triodes are economical in cost and space, it is apparent that pentodes suitably connected would result in even higher speed operation.

Instead of using transformers for coupling between the stages, choke coupling could be used; that is, a choke is inserted in place of the transformer primary and the voltage across this choke capacitively coupled to the appropriate point.

In a representative test, the circuit herein disclosed, utilizing type 5687 commercially available twin triodes, reliably counted input signals at frequencies as high as 11.5 megacycles. A reliable, visual indication of the residual count was obtained with the neon bulb display system shown; reliability being enhanced by the dependence of neon bulb illumination only on the state of conduction or non-conduction of but two tubes.

Numerous modifications may now be made by one skilled in the art without departing from the novel system disclosed herein; hence, the present invention is to be construed as limited only by the spirit and scope of the appended claims.

What is claimed is:

1. A visually indicating counter comprising a ring counter of bistable stages actuated by an input bistable stage, and a plurality of gas-filled indicating bulbs connected therebetween, each bistable stage being a flip-flop having a pair of electron tubes, each of said bulbs being connected from only a respective one of said ring counter bistable stages to a selected one of said input stage electron tubes whereby only the bulb then connected from a conducting electron tube in a ring counter bistable stage to a non-conducting electron tube in said input bistable stage is illuminated.

2. A visually indicating counter comprising a plurality of ring-connected bistable multivibrators actuated from a single bistable multivibrator each of said multivibrators having first and second plates, the plate potential for said single bistable multivibrator being supplied from a source of relatively high direct potential, the plate potential for said ring-connected bistable multivibrators being supplied from a source of relatively low direct potential, and associated with each ring-connected multivibrator a pair of gas-filled indicating bulbs each with first and second electrodes and having a firing potential slightly greater than the difference between said relatively high and low direct potentials, means for coupling said first electrodes respectively to said first and second plates of said input multivibrator and said second electrodes to said first plate of the associated ring-connected multivibrator.

3. Apparatus for counting a progression of input pulses comprising, an input bistable stage, a ring counter including a plurality of cascaded bistable stages coupled to and actuated from said input bistable stage and providing therewith circuit means capable of cyclically assuming a plurality of distinctive stable states in response to a like plurality of input pulses, and a corresponding plurality of two-electrode gas-filled bulbs, each having one electrode coupled to a point in a respective one of said ring counter cascaded bistable stages and the other electrode coupled to a point in said bistable stage and arranged whereby the sequential illumination of said bulbs visually indicates the distinctive stable states assumed in response to said input pulses.

4. A decade counter for counting a progression of input pulses comprising an input bistable stage, a ring-of-five counter having five cascaded bistable stages coupled to and actuated from said input bistable stage and providing therewith circuit means capable of sequentially assuming ten distinctive stable states in response to ten input pulses, and ten two-electrode gas-filled bulbs, each having one electrode coupled to a point in one of said five cascaded bistable stages and the other electrode coupled to a point in said input bistable stage and arranged whereby the sequential change of stable states correspondingly illuminates said bulbs in sequence to visually indicate the number of input pulses.

5. A decade counter for counting a progression of input pulses comprising, an input bistable multivibrator, five ring-connected bistable multivibrators, a transformer coupling the output of said input multivibrator simultaneously to said five ring-connected multivibrators thereby providing circuit means capable of sequentially assuming ten distinctive stable states in response to ten input pulses, and ten two-electrode gas-filled bulbs each having one electrode coupled to one of said ring-connected multivibrators and the other electrode coupled to a point in said input multivibrator and arranged to be selectively illuminated to indicate visually each of said ten stable states.

6. A visually indicating electronic counter for accumulating a progression of input pulses comprising, an input bistable multivibrator having first and second output circuits, means for applying said input pulses to said input multivibrator thereby providing an output pulse from said second output circuit for each two of said input pulses, a ring counter formed of a plurality of bistable multivibrators each having first and second input and output circuits and assuming first and second stable states, each of said ring second output circuits being coupled to actuate the next successive first input circuit, each of said ring second input circuits being arranged to receive said output pulses from said second output circuit of said input multivibrator, a pair of two-electrode gas-filled bulbs associated with each of said multivibrators in said ring counter, the electrodes of one bulb in each pair being coupled between said first output circuit of the associated multivibrator and said first output circuit of said input multivibrator, the electrodes of the other bulb in each pair being coupled between said first output circuit of the associated multivibrator and said second output circuit of said input multivibrator, and means for initially establishing said first stable state in a selected one of said ring counter multivibrators and said second stable state in all others of said ring counter multivibrators whereby said first stable state is shifted to the following ring counter multivibrator in response to each of said output pulses.

7. A visually indicating electronic counter for accumulating a progression of input pulses comprising, an input bistable multivibrator having first and second output circuits, means for applying said input pulses to said input multivibrator thereby providing an output pulse from said second output circuit for each two of said input pulses, a ring counter formed of a plurality of bistable multivibrators each having first and second input and output circuits and assuming first and second stable states, each of said ring second output circuits being coupled to actuate the next successive first input circuit, each of said ring second input circuits being arranged to receive said output pulses from said second output circuit of said input multivibrator, a pair of two electrode gas-filled bulbs associated with each of said multivibrators in said ring counter, the electrodes of one bulb in each pair being resistively coupled between said first output circuit of the associated multivibrator and said first output circuit of said input multivibrator, the electrodes of the other bulb of each pair being resistively coupled between said first output circuit of the associated multivibrator and said output circuit of said input multivibrator, and means for initially establishing said first stable state in a selected one of said ring counter multivibrators and said second stable state in all others of said ring counter multivibrators whereby said first stable state is shifted to the following ring counter multivibrator in response to each of said output pulses.

8. A visually indicating electronic counter for accumulating a progression of input pulses comprising, an input bistable multivibrator having first and second output circuits, means for applying said input pulses to said input multivibrator thereby providing an output pulse from said second output circuit for each two of said input pulses, a ring counter formed of a plurality of bistable multivibrators each having first and second input and output circuits and assuming first and second stable states, each of said ring second output circuits being coupled to actuate the next successive first input circuit, each of said ring second input circuits being arranged to receive said output pulses from said second output circuit of said input multivibrator, a pair of gas-filled bulbs having first and second electrodes associated with each of said multivibrators in said ring counter, the first electrodes of the bulbs in each pair being joined in parallel and resistively coupled to said first output circuit of the associated multivibrator, the second electrodes of one bulb in each of said pairs being connected in parallel and resistively coupled to said first output circuit of said input multivibrator, the second electrodes of the other bulb in each of said pairs being connected in parallel and resistively coupled to said second output circuit of said input multivibrator, and means for initially establishing said first stable state in a selected one of said ring counter multivibrators and said second stable state in all others of said ring counter multivibrators whereby said first stable state is shifted to the following ring counter multivibrator in response to each of said output pulses.

9. A visually indicating electronic counter for accumulating a progression of input pulses comprising, an input bistable multivibrator having first and second output circuits, means for applying said input pulses to said input multivibrator thereby providing an output pulse from said second output circuit for each two of said input pulses, a ring counter formed of a plurality of bistable multivibrators each having first and second input and output circuits and assuming first and second stable states, a transformer having a primary winding in said second output circuit of said input multivibrator and an independent secondary winding coupled to each of said second input circuits of said ring counter multivibrators, each of said ring counter second output circuits being coupled to actuate the next successive first input circuit, a pair of gas-filled bulbs having first and second electrodes associated with each of said multivibrators in said ring counter, the first electrodes of the bulbs in each pair being joined in parallel and resistively coupled to said first output circuit of the associated multivibrator, the second electrodes of one bulb in each of said pairs being connected in parallel and resistively coupled to said first output circuit of said input multivibrator, the second electrodes of the other bulb in each of said pairs being connected in parallel and resistively coupled to said second output circuit of said input multivibrator, and means for initially establishing said first stable state in a selected one of said ring counter multivibrators and said second stable state in all others of said ring counter multivibrators whereby said first stable state is shifted to the following ring counter multivibrator in response to each of said output pulses.

10. Apparatus as in claim 9 wherein said input multivibrator and each of said ring multivibrators includes two triode electron tubes having a common cathode connection and a common cathode network formed of first and second serially connected resistance-capacitance networks, said first network having a time constant substantially greater than that of said second network.

11. Apparatus as in claim 9 wherein each of said second output circuits of said ring multivibrators actuates the next successive first input circuit through a coupling transformer.

12. Apparatus as in claim 9 and including means for applying unequal direct potentials to said input multivibrator and to said multivibrators in said ring counter, the difference between said potentials being slightly less than the firing potential of said gas-filled bulbs.

13. Apparatus as in claim 9 wherein said input multivibrator and each of said ring multivibrators comprises first and second intercoupled triode electron tubes each having a cathode, grid and plate, a pair of plate potential sources arranged to furnish one plate potential to said input multivibrator triode tubes and a substantially different plate potential to said ring multivibrator triode tubes, the potential difference between the latter two sources being slightly less than the firing potential of said gas-filled bulbs, said multivibrators being arranged whereby a predetermined multivibrator in said ring assumes a first stable state in which the first triode thereof conducts with the second triode cut-off, while the remaining ring multivibrators each assume a second stable state in which said second triode conducts with said first triode cut-off, an output pulse from said input multivibrator being effective to sequentially shift the first stable state of said predetermined multivibrator to the next successive multivibrator in said ring, while said predetermined multivibrator assumes said second stable state.

14. An electronic decade counter for visually indicating the decimal count of a progression of input pulses comprising, an input bistable multivibrator having first and second output circuits, means for applying said input pulses to said input multivibrator thereby providing output pulses from said second output circuit for each two of said input pulses, a ring counter formed of five bistable multivibrators each having first and second input and output circuits and assuming first and second stable states, a transformer having a primary winding in said second output of said input multivibrator and five independent secondary windings each of said secondary windings being coupled to a respective one of said second input circuits of said five ring counter multivibrators, each of said ring counter second output circuits being coupled to actuate the next successive first input circuit, ten gas-filled bulbs having first and second electrodes associated in pairs with each of said five multivibrators in said ring counter, the first electrodes of the bulbs in each pair being joined in parallel and resistively coupled to said first output circuit of the associated multivibrator, the second electrodes of one bulb in each of said pairs being connected in parallel and resistively coupled to said first output circuit of said input multivibrator, the second electrodes of the other bulb in each of said pairs being connected in parallel and resistively coupled to said second output circuit of said input multivibrator, means for initially establishing said first stable state in a selected one of said ring counter multivibrators and said second stable state in all others of said ring counter multivibrators whereby said first stable state is shifted to the following ring counter multivibrator in response to each of said output pulses, and first and second sources of direct potential for supplying plate potential to said input multivibrator and said ring counter multivibrators respectively, the potential difference between the latter two sources being slightly less than the firing potential of said gas-filled bulbs.

15. Apparatus as in claim 9 wherein said coupling from said second output circuits of said ring counter multivibrator to said input circuits of successive ring multivibrators is effected by inductive elements.

16. A high speed decade electronic counter for visually indicating the accumulated count comprising, an input bistable multivibrator, five ring-connected multivibrators with first and second inputs transformer coupled to the output of the preceding multivibrator in the ring and said input multivibrator respectively, the primary winding of each coupling transformer being shunted by a diode, said multivibrators assuming first and second stable states and comprising first and second triode electron tubes each having a grid, cathode and plate, said cathodes being connected together, a common terminal, first and second resistance-capacitance networks which are serially-connected between the junction of said cathodes and said common terminal, said networks comprising a resistance shunted by a capacitance, said first network being connected to said common terminal and having a time constant much greater than that of said second network whereby the cathode potential rises for a short interval after the multivibrator changes stable states, a pair of unilaterally conducting devices connected between the grids of the respective electron tubes and the junction of said networks for clamping the respective grid potentials to the potential of the latter junction, first and second gas-filled bulbs associated with each ring-connected multivibrator and having first and second electrodes, the second electrodes coupled to the plate of said first electron tube of the associated ring-connected multivibrator, the first electrodes of said first and second bulbs respectively coupled to the plates of said first and second electron tubes of said input multivibrator, first and second sources of direct potential for supplying plate potential to said input multivibrator and said ring-connected multivibrators respectively whereby the potential difference between the two sources is applied across a gas-filled bulb coupled between two plates not then drawing current to bias the latter bulb at a potential just below its firing potential, and means for initially establishing said first stable state in a selected one of said ring-connected multivibrators and said second stable state in all others of said ring-connected multivibrators whereby said first stable state is shifted to the following ring counter multivibrator in response to alternate changes in stable state of said input bistable multivibrator.

17. A counter comprising, a plurality of ring-connected bistable multivibrator stages, one of said stages residing in a first stable state while the others reside in a second stable state, means for intercoupling said stages whereby a change of said one stage from the first stable state to the second stable state activates a change in the following stage from the second stable state to the first stable state, the first of said stages responding to such changes in the last of said stages, an input bistable multivibrator stage adapted to provide in response to an input pulse train, a number of output pulses substantially equal to one-half the number of said input pulses, means for applying said output pulses to all of said ring-connected stages to change the stage then in the first stable state to the second stable state, wherein each of said multivibrators has first and second electron tubes each having a plate electrode and further comprising a pair of two electrode indicating bulbs associated with each ring-connected stage, first electrodes of said bulbs connected together and coupled to said first plate of its associated stage, the second electrodes of said bulbs connected respectively to said first and second plates in said input multivibrator stage.

18. The apparatus of claim 17 and first and second sources of direct potential which supply plate potential to said input and ring-connected stages respectively, the potential difference between said sources being slightly less than the firing potential of said indicating bulbs.

19. A counter comprising, a plurality of ring-connected bistable multivibrator stages each having first and second plates and arranged whereby one of said stages resides in a first stable state while the others reside in a second stable state, means for intercoupling said stages whereby a change of said one stage from the first stable state to the second stable state activates a change in the following stage from the second stable state to the first stable state, the first of said stages responding to corresponding changes in the last of said stages, an input bistable multivibrator stage which provides one output pulse for every two input pulses and having first and second plates, means for coupling each output pulse to all of said ring-connected stages to initiate a change in said one stage from the first stable state to the second stable state, and first and second indicating bulbs associated with each ring-connected stage, each bulb having first and second electrodes, the first electrodes of said first and second bulbs respectively coupled to the first and second plates of said input stage, the second electrodes coupled to said first plate of the associated ring-connected stage.

20. A high speed counter comprising, cascaded ring-connected bistable stages, an input bistable stage, each bistable stage including first and second electron tubes with plate electrodes and assuming a first stable state with said first and second tubes conducting and non-conducting respectively and a second stable state with said first and second tubes non-conducting and conducting respectively, a pair of gas-filled indicating bulbs for each ring-connected stage each having first and second electrodes, said first electrodes direct-coupled to said first electron tube, said second electrodes direct-coupled respectively to said first and second electron tube plate electrodes of said input stage, means for establishing said first stable state in only one of said ring-connected stages and said second stable state in all other stages thereof, a source of input pulses, means for coupling said input pulses to said input bistable stage to change its stable state in response to each input pulse, said input bistable stage providing an output pulse in response to alternate ones of said input pulses, means for coupling all of said output pulses to each ring-connected bistable stage to reset the ring-connected stage then in the first stable state to the second stable state, and means responsive to a ring-connected stage changing from the first stable state to the second stable state for changing the following ring-connected stage from the second stable state to the first stable state whereby only that gas-filled bulb coupled between a ring-connected bistable stage in the first stable state and the plate of an input electron tube then not conducting is ignited, thereby igniting each of said bulbs in sequence during mutually exclusive time intervals.

References Cited in the file of this patent

UNITED STATES PATENTS

| | | |
|---|---|---|
| 2,407,320 | Miller | Sept. 10, 1946 |
| 2,519,513 | Thompson | Aug. 22, 1950 |
| 2,521,787 | Grosdoff | Sept. 12, 1950 |
| 2,537,427 | Seid et al. | Jan. 9, 1951 |
| 2,547,511 | Weissman | Apr. 3, 1951 |
| 2,665,846 | Gilbert | Jan. 12, 1954 |
| 2,691,100 | Moody et al. | Oct. 5, 1954 |
| 2,749,514 | Zaffarano | June 5, 1956 |
| 2,756,934 | Ziffer | July 31, 1956 |
| 2,802,941 | McConnell | Aug. 13, 1957 |
| 2,803,747 | Woods | Aug. 27, 1957 |

OTHER REFERENCES

"A Four-Tube Counter Decade" (John T. Potter); Electronics, vol. 17, June 1944 (pp. 110–114, see Fig. 3).

"An Improved Fast Scaler" (H. K. Schoenwetter); The Review of Scientific Instruments, vol. 24, No. 7, July 1953, pp. 515–517.

"A Ten Millimicrosecond Scaler" (Joachim Fischer and John Marshall), Proceedings of National Electronics Conference, 1953 (pages 494, Scaling Circuit, and page 495, Clamping Network).